United States Patent
Weed et al.

(10) Patent No.: US 9,581,698 B2
(45) Date of Patent: Feb. 28, 2017

(54) SYSTEMS AND METHODS TO MONITOR FOR FALSE ALARMS FROM IONOSPHERE GRADIENT MONITORS

(71) Applicant: Honeywell International Inc., Morristown, NJ (US)

(72) Inventors: Douglas Weed, Forest Lake, MN (US); Randy J. Reuter, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 435 days.

(21) Appl. No.: 14/171,569

(22) Filed: Feb. 3, 2014

(65) Prior Publication Data
US 2015/0219766 A1    Aug. 6, 2015

(51) Int. Cl.
| | | |
|---|---|---|
| G01S 19/20 | (2010.01) | |
| G01S 19/07 | (2010.01) | |
| G01S 19/08 | (2010.01) | |
| G01S 19/21 | (2010.01) | |

(52) U.S. Cl.
CPC .............. G01S 19/07 (2013.01); G01S 19/08 (2013.01); G01S 19/21 (2013.01)

(58) Field of Classification Search
CPC .................................. G01S 19/07; G01S 19/20
USPC ........................................ 342/357.44, 357.58
See application file for complete search history.

(56) References Cited

U.S. PATENT DOCUMENTS

| | | | | | |
|---|---|---|---|---|---|
| 6,166,683 | A  * | 12/2000 | Hwang | ................... | G01S 19/20 |
| | | | | | 342/357.37 |
| 6,332,072 | B1 * | 12/2001 | Johnson | ................. | H04B 17/20 |
| | | | | | 342/368 |
| 6,801,854 | B1 * | 10/2004 | Pemble | ................... | G01S 19/08 |
| | | | | | 701/470 |
| 7,095,369 | B1 * | 8/2006 | Clark | ..................... | G01S 19/02 |
| | | | | | 342/357.58 |

(Continued)

FOREIGN PATENT DOCUMENTS

WO         2009125011         10/2009

OTHER PUBLICATIONS

Belabbas et al., "A GBAS Testbed to Support New Monitoring Algorithms Development for CAT III Precision Approach", "Proceedings of the European National Conference", Oct. 19-21, 2010, pp. 18, Publisher: Institute of Communications and Navigation, Published in: DE.

(Continued)

Primary Examiner — Marcus Windrich
(74) Attorney, Agent, or Firm — Fogg & Powers LLC

(57) ABSTRACT

Systems and methods to monitor for false alarms from ionosphere gradient monitors are provided. In one embodiment, a method for mitigating false gradient alarms in a satellite navigation Ground Based Augmentation System (GBAS) ground station comprising a plurality of satellite navigation system reference receivers comprises: generating an alarm signal with an ionosphere gradient monitor (IGM) at the GBAS ground station; determining whether the alarm signal is a false alarm based on data derived from carrier phase measurements received from the plurality of satellite navigation system reference receivers; and blocking the alarm signal for at least a first duration of time based on the determining.

20 Claims, 6 Drawing Sheets

(56) References Cited

U.S. PATENT DOCUMENTS

| | | | | |
|---|---|---|---|---|
| 8,094,064 | B2* | 1/2012 | Brenner | G01S 19/08 342/357.26 |
| 8,242,953 | B2* | 8/2012 | Dai | G01S 19/32 342/357.24 |
| 8,305,266 | B2* | 11/2012 | Damidaux | G01S 19/07 342/357.44 |
| 8,451,168 | B2 | 5/2013 | Henkel et al. | |
| 9,091,757 | B2* | 7/2015 | Chen | G01S 19/44 |
| 9,116,231 | B2* | 8/2015 | Vollath | G01S 19/23 |
| 2005/0146461 | A1* | 7/2005 | Pande | G01S 19/07 342/357.44 |
| 2006/0273953 | A1* | 12/2006 | Watson | G01S 19/32 342/357.23 |
| 2009/0262013 | A1* | 10/2009 | Vollath | G01S 19/44 342/357.27 |
| 2011/0115669 | A1* | 5/2011 | Milyutin | G01S 19/20 342/357.27 |
| 2013/0063307 | A1* | 3/2013 | Krasner | G01S 19/05 342/387 |
| 2014/0152495 | A1* | 6/2014 | Khushu | G01S 5/0263 342/357.39 |

OTHER PUBLICATIONS

Murphy et al., "GBAS Differentially Corrected Positioning Service Ionospheric Anomaly Errors Evaluated in an Operational Context", "In Proceedings of the 2010 International Technical Meeting of the Institute of Navigation", Oct. 2001, pp. 394-410.

European Patent Office, "Extended European Search Report from EP Application No. 14192170.0 mailed Jul. 3, 2015", "from Foreign Counterpart of U.S. Appl. No. 14/171,569", Jul. 3, 2015, pp. 1-7, Published in: EP.

Arthur, "The Disparity of Parity, Determining Position Confidence Bounds in the Presence of Biases", "ION GNSS 18th International Technical Meeting of the Satellite Division", Sep. 13-16, 2005, pp. 1841-1853, Published in: Long Beach, CA.

Kline, "An Experimental Investigation of Relativistic Effects in GPS", "Navigation: Journal of the Institute of Navigation", Winter 1998-1999, pp. 297-305, vol. 45, No. 4.

Lee et al., "Enhancements of Long term Ionospheric Anomaly Monitoring for the Ground-Based Augmentation System", "Proceedings of the 2011 International Technical Meeting of the Institute of Navigation", Jan. 26, 2011, pp. 930-941, Publisher: The Institute of Navigation, Published in: US.

Pervan et al., "Parity Space Methods for Autonomous Fault Detection and Exclusion using GPS Carrier Phase", "1996 Position Location and Navigation Symposium", Apr. 22-26, 1996, pp. 649-656, Published in: Atlanta, GA.

Reuter et al., "Ionosphere Gradient Detection for Cat III GBAS", "25th International Technical Meeting of the Satellite Division of the Institute of Navigation", Sep. 17-21, 2012, pp. 2175-2183, Published in: Nashville, TN.

Sturza, "Navigation System Integrity Monitoring Using Redundant Measurements", "Navigation: Journal of the Institute of Navigation", Mar. 1, 1989, pp. 483-501, vol. 35, No. 4, Publisher: Institute of Navigation, Published in: US.

* cited by examiner

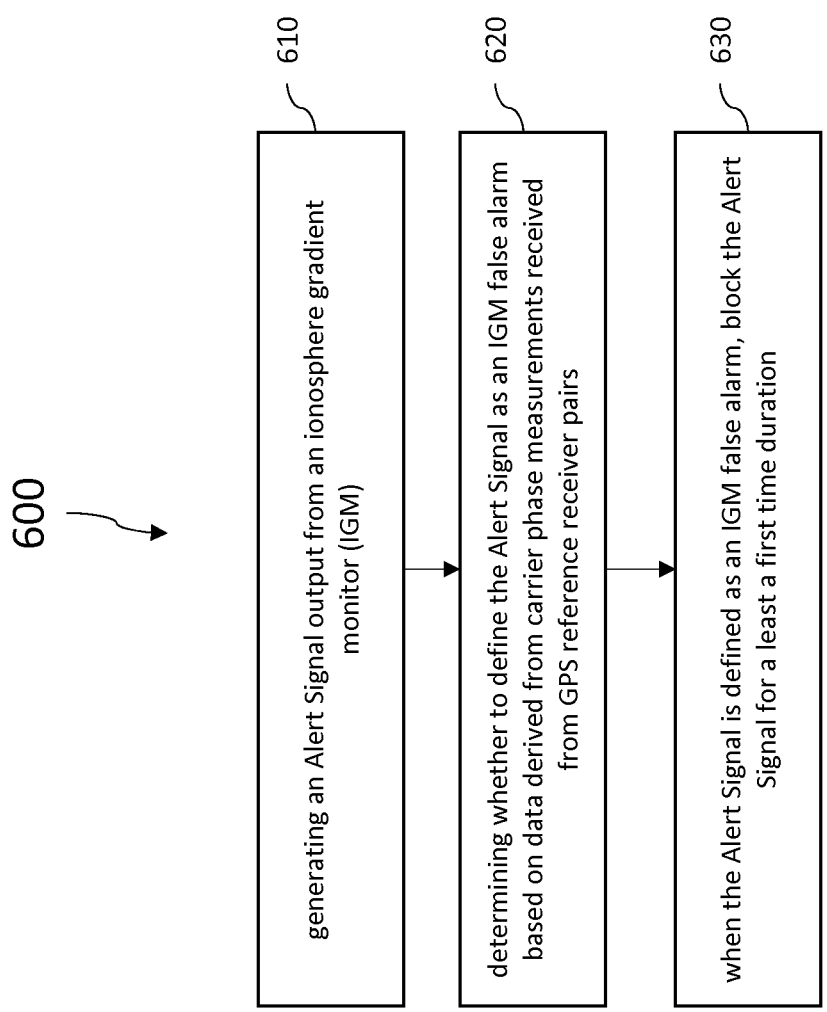

SYSTEMS AND METHODS TO MONITOR FOR FALSE ALARMS FROM IONOSPHERE GRADIENT MONITORS

GOVERNMENT LICENSE RIGHTS

The U.S. Government may have certain rights in the present invention as provided by the terms of U.S. Government Prime Contract DTFACT-10-C-00013 awarded by the U.S. Federal Aviation Administration.

BACKGROUND

Ground based global navigation satellite augmentation systems may be required to employ Ionosphere Gradient Monitors (IGMs) at their ground stations to identify delay gradients caused by extreme changes in the electron density of the ionosphere. An example of one such IGM is described in U.S. Pat. No. 8,094,064 entitled "Ground-Based System and Method to Monitor For Excessive Delay Gradients", herein incorporated by reference in its entirety and referred to herein as the "'064 patent". In summary the IGM produces an alert signal or exclusion command telling the ground station to stop using or exclude a certain navigation satellite when the IGM detects that satellite exceeded a threshold.

One problem that exists is that other environmental conditions can sometimes trip an IGM causing excessive alerts in the form of false IGM alarms. For example, in some locations heat-induced tropospheric turbulence in the proximity of a ground station can interfere with a reference receiver, causing a false IGM alarm. False IGM alarms cause the ground station to exclude a satellite even though the satellite signal is still usable.

For the reasons stated above and for other reasons stated below which will become apparent to those skilled in the art upon reading and understanding the specification, there is a need in the art for improved systems and methods to monitor for false alarms from ionosphere gradient monitors.

SUMMARY

The Embodiments of the present invention provide methods and systems to monitor for false alarms from ionosphere gradient monitors, and will be understood by reading and studying the following specification.

In one embodiment, a method for mitigating false gradient alarms in a satellite navigation Ground Based Augmentation System (GBAS) ground station comprising a plurality of satellite navigation system reference receivers comprises: generating an alarm signal with an ionosphere gradient monitor (IGM) at the GBAS ground station; determining whether the alarm signal is a false alarm based on data derived from carrier phase measurements received from the plurality of satellite navigation system reference receivers; and blocking the alarm signal for at least a first duration of time based on the determining.

BRIEF DESCRIPTION OF THE DRAWINGS

Embodiments of the present invention can be more easily understood and further advantages and uses thereof more readily apparent, when considered in view of the description of the preferred embodiments and the following figures in which:

FIG. 6 is a flow chart illustrating a process for a false alarm detection scheme of one embodiment of the present disclosure.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide systems and methods for identifying when an ionosphere gradient monitor (IGM) monitor has issued a false IGM alarm and use that information to prevent, or at least delay, a ground station from excluding a global navigation satellite due to the false IGM alarm.

Figure 1:
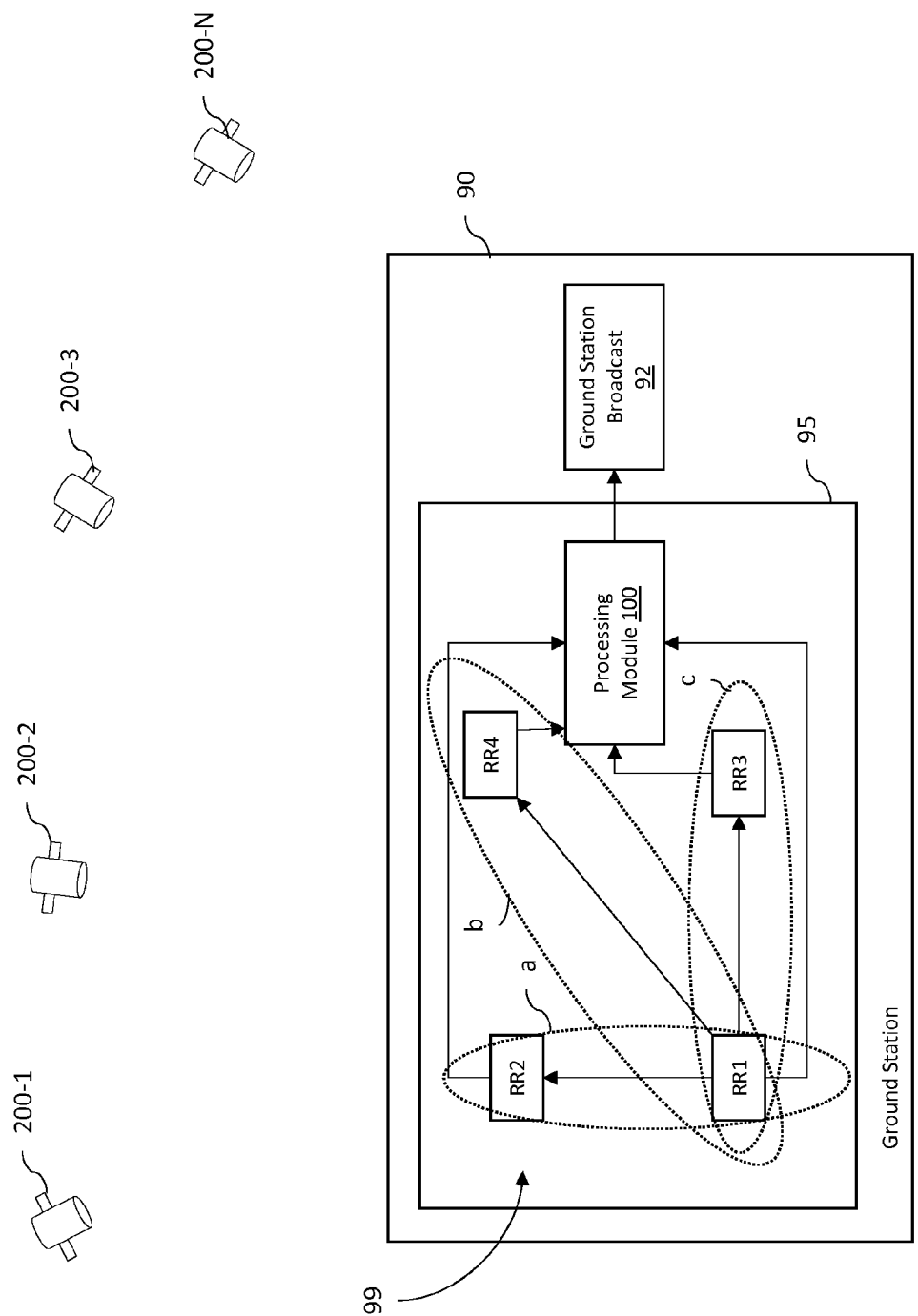
FIG. 1 is a diagram illustrating a ground station that monitors for excessive delay gradients in satellite signals in accordance with one embodiment of the present disclosure.

FIG. 1 is a block diagram illustrating a GBAS (Ground Based Augmentation System) ground station 90, such as an Approach Service Type D (GAST D) ground station, of one embodiment of the present disclosure. In one embodiment, ground station 90 comprises an ionosphere gradient monitor that monitors for excessive delay gradients in satellite signals such as described in the '064 patent. As shown in FIG. 1, ground station 90 includes a horizontal delay gradient monitor 95 (also referred to herein as the ionosphere gradient monitor, or IGM) and a ground station broadcast 92. The ground station broadcast 92 is that portion of the ground station 90 that transmits signals to aircraft in the vicinity of the ground station 90. The horizontal delay gradient monitor 95 monitors for an excessive delay gradient present in the horizontal plane for signals transmitted from a monitored global navigation satellite such as one of satellites 200-1 to 200-N. In one embodiment, satellites 200-1 to 200-N are Global Positioning System (GPS) global navigation satellites.

IGM 95 includes at least two reference receivers (referred to collectively herein as reference receivers 99) positioned in a known geometric relationship to each other and a processing module 100. The embodiment shown in FIG. 1 includes four reference receivers (shown individually as RR1-RR4). In one embodiment, a horizontal delay gradient has a horizontal component that lies in the plane that encompasses the reference receivers 99. The processing module 100 is communicatively coupled to each of the reference receivers 99. During operation, the horizontal delay gradient monitor 95 receives signals from at least two of satellites 200(1-N).

Figure 2:
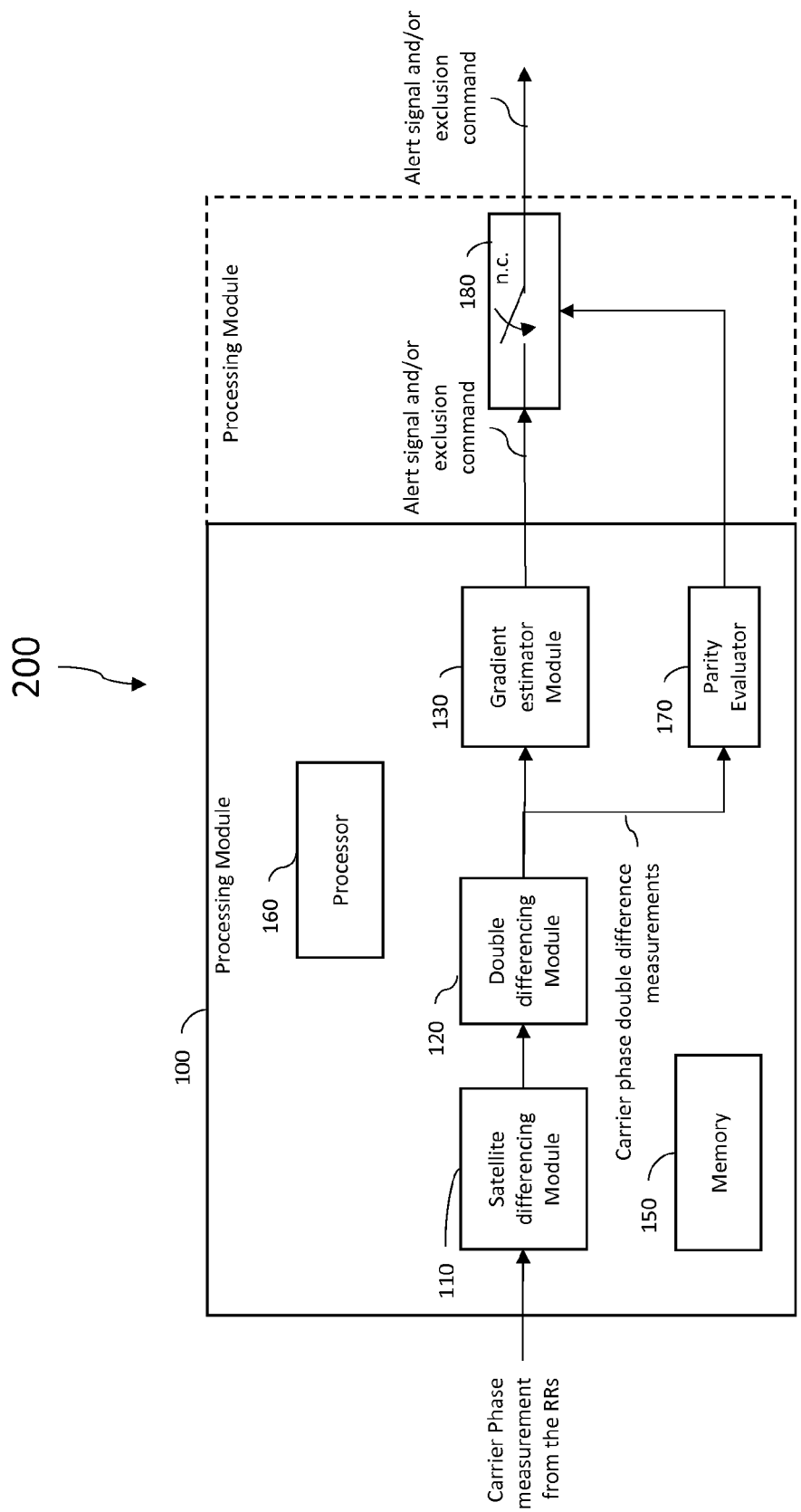
FIG. 2 is a diagram illustrating a processing module implementing a false alarm detection scheme of one embodiment of the present disclosure.

FIG. 2 is a block diagram illustrating the integration of a parity based false alarm mitigation scheme (generally at 200) with a processing module 100 of one embodiment of the present invention. As shown in FIG. 2, processing module 100 comprises a satellite difference module 110, double differencing module 120, gradient estimator module 130, memory 150, and at least one processor 160, each of which perform as described in the '064 patent to monitor Carrier Phase measurements from the reference receivers 99 and produce an alert signal and/or exclusion command (which are both collectively referred to herein as an IGM alarm). For the reasons explained below, three or more reference receivers are utilized when implementing a parity based false alarm mitigation scheme The satellite differencing module 110, the double differencing module 120, the gradient estimator module 130 and the various other elements of processing function 100 discussed in this disclosure may be implemented as software modules executed by processor 160. In one embodiment, memory 150 includes a computer readable medium encoded with computer instructions for performing these functions of processing module 100 described herein. It therefore should be appreciated that two or more of these elements may be combined and implemented in the same module. The satellite differencing module 110 is communicatively coupled to provide input to the double differencing module 120. The double differencing module 120 is communicatively coupled to provide input to the gradient estimator module 130. The processor 160 and memory 150 are communicatively coupled to the other elements of processing module as required to perform the functions described herein.

Memory 150 comprises any suitable non-transient memory now known or later developed for the storage of data. As such, memory 150 may comprise, for example, random access memory (RAM), non-volatile memory, read only memory (ROM), and/or registers within the processor 160. In one implementation, processor 160 comprises microprocessors or microcontrollers. Moreover, although the processor 160 and the memory 150 are shown as separate elements in FIG. 1, in one implementation, the processor 160 and memory 150 are implemented in a single device (for example, a single integrated-circuit device). In one implementation, the processor 160 comprises processor support chips and/or system support chips such as application-specific integrated circuits (ASICs).

As described in the '064 patent and generally summarized herein, the satellite differencing module 110 determines differences in the carrier phase measurements between the signals from the monitored satellite and at least one other satellite. The carrier phase measurements are accepted at the satellite differencing module 110 from the reference receivers 99. The satellite differencing module 110 determines differences in the carrier phase measurements between the radio frequency signals received from a monitored satellite (such as satellite 200-1 for example) at the reference receivers 99 and the radio frequency signals received from at least a subset of the other satellites at the reference receivers 99. The double differencing module 120 forms double differences between pairs of the reference receivers (such as pairs "a", "b", or "c" shown in FIG. 1 or the pairs a-f shown in FIG. 3). The double differencing module 120 is communicatively coupled to provide input to the gradient estimator module 130. The input provided to the gradient estimator module 130 is the averaged, compensated (including modulo operation) double differences, also referred to herein as carrier phase double differences. The averaged, compensated double differences are accepted at the gradient estimator module 130. The gradient estimator module 130 estimates a magnitude of the horizontal delay gradient resulting from a gradient in the ionosphere between the monitored satellite 200-1 and the pairs of reference receivers 99. Horizontal delay gradients can also result from other anomalous signal conditions.

The gradient estimator module 130 issues an IGM alarm if the estimated magnitude of the horizontal delay gradient exceeds a selected threshold. The IGM alarm can be an alert signal and/or an exclusion command. In one embodiment, an exclusion command is sent from the IGM 95 to the ground station broadcast 92. In another embodiment, an alert signal is sent from the IGM 95 to the ground station broadcast 92. In another embodiment, an IGM alarm is also sent from the IGM 95 to the ground station 90 and the ground station 90 is communicatively coupled to a display to alert an air traffic controller based on the issuing of the IGM alarm. In one embodiment, ground station 90 takes steps to cease the broadcast or to exclude the affected monitored satellites from providing navigation system data to an aircraft if at least one of the monitored satellites has an estimated gradient that exceeded the threshold.

To implement the parity based false alarm mitigation scheme, processing module 100 further comprises a parity evaluator 170 that receives the carrier phase double difference data generated by double differencing module 120 for the various reference receiver pairs and analyzes the carrier phase double difference data to identify inconsistencies between reference receiver pairs in order to arrive at a parity value. Since at least two sets of reference receiver pairs are compared, at least three reference receivers are needed for this scheme. When excessive inconsistencies are detected, parity evaluator 170 activates a switch 180 that interrupts the further propagation of any present IGM alarm output generated by gradient estimator module 130. When excessive inconsistencies are not detected, any IGM alarm present is passed through to permit exclusion of the affected satellite. It should be appreciated that the term "switch" as used herein is not intended to be limited to electromechanical relays, but should be construed to include solid-state electronics, transistor and logic circuits, and integrated circuit switching technologies. As shown in FIG. 2, switch 180 may be a component external to processing module 100, or integrated within processing module 100.

Figure 3:
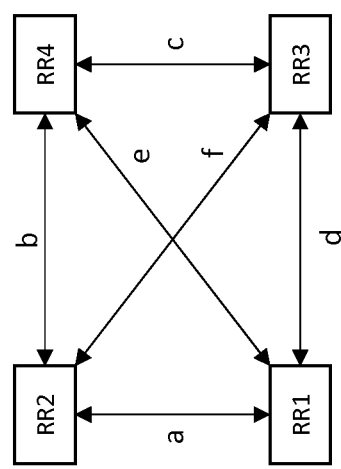
FIG. 3 is a diagram illustrating reference receiver pairs of one embodiment of the present disclosure.

As used herein, the term "parity" refers to a measurement of any inconsistency in the carrier phase double difference data between pairs of the ground station 90's reference receivers 99. For example, in one embodiment, the carrier phase double difference between a pair of reference receivers may be obtained and divided by the distance between the reference receivers. This would serve to normalize the carrier phase double difference value so that difference reference receiver pairs separated by different distances can be compared. Referring to FIG. 3, reference receivers 99 are shown and receiver pairings are indicated by the arrows labeled a-f. That is, for example, pair "a" comprises reference receivers RR1 and RR2, pair "b" comprises reference receivers RR2 and RR4, and so on. As discussed in greater detail in the '064 patent, for each of these pairs, carrier phase double difference values are calculated (by double differencing module 120) and communicated to the gradient estimator module 130. If an environmental gradient is significant and persistent, then it should be observable in the carrier phase double difference values for each of the pairs so that the pairs can be said to react with consistency. That is, if the IGM alarm is real and not false, there should be no observable inconsistency in the data between one reference receiver pair (e.g., pair "a") and the data between a second reference receiver pair (e.g., pair "c"). A parity error value is therefore determined as a function of the delta in carrier phase double difference values between reference receiver pairs. A perfect consistency in carrier phase double difference values would produce a parity of zero.

In this way, parity evaluator 170 uses parity information derived from the reference receiver pairs to determine if an IGM alarm is a false alarm. It observes inconsistency in data measurements between a first pair of references receivers and a second pair of references receivers to decide if an IGM alarm is a false alarm. When an elevated parity error is observed and exceeds a threshold value, that error is an indication that there is an inconsistency or some problem in the information being used by processing module 100 to generate IGM alarms and that any IGM alarm currently being generated by processing module 100 is likely a false alarm.

Figure 4:
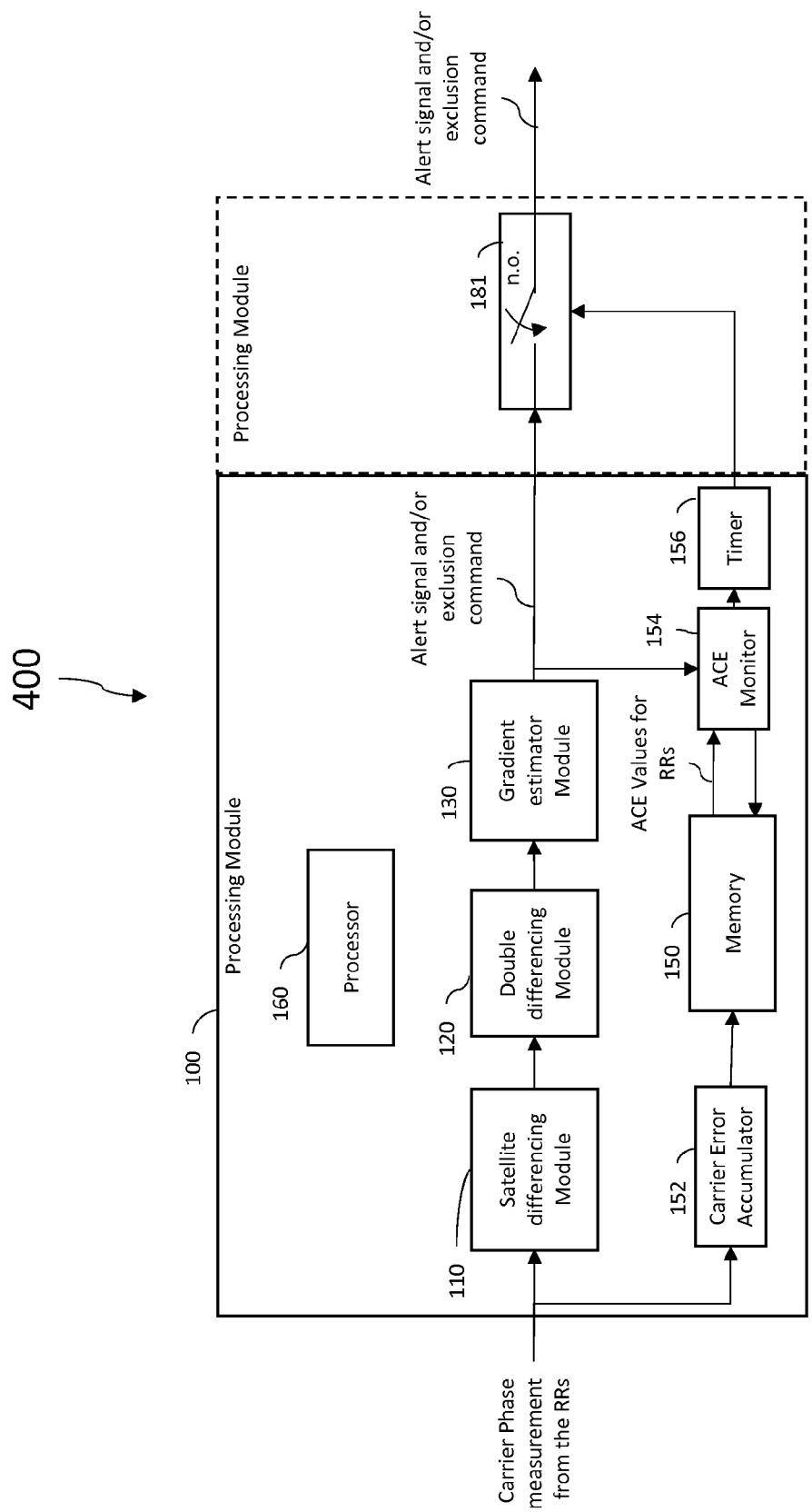
FIG. 4 is a diagram illustrating a processing module implementing another false alarm detection scheme of one embodiment of the present disclosure.

FIG. 4 is a block diagram for an alternate embodiment illustrating the integration of an accumulated carrier error (ACE) based false alarm mitigation scheme (generally at 400) with the processing module 100 described above. Instead of using carrier phase double difference data and comprising parity evaluator 170, an accumulated carrier error measurement for each of the reference receivers 99 may be utilized. In the embodiment shown in FIG. 4, the carrier phase measurements received from the reference receiver 99 are provided to a carrier error accumulator 152, which stores an ACE value associated with each of the reference receivers 99 into memory 150. These values are utilized by the ACE monitor 154 to assess whether or not an IGM alarm generated by gradient estimator module 130 is considered a false IGM alarm. More specifically, ACE monitor 154 observes the change in the ACE values over time to decide whether an IGM alarm should be propagated or blocked. Since this ACE based false alarm mitigation scheme does not depend on comparing data derived from different pairs of reference receivers, it can be implemented at a ground station having at least two reference receivers. In operation, when gradient estimator module 130 initiates an IGM alarm, the alarm signal is provided to both ACE monitor 154 and a switch 181 which is operated by ACE monitor 154. Switch 181 is a "normally open" switch, meaning that it is maintained in a state that blocks the IGM alarm from passing through until a permissive signal is received from the ACE monitor 154. When ACE monitor 154 senses the presence of the IGM alarm, it begins monitoring the ACE values stored in memory 150. When the ACE monitor 154 detects a change in the monitored ACE values that exceeds a threshold, that event is interpreted as indicating that a valid reason exists for excluding a navigation satellite. Switch 181 is operated to permit the IGM alarm to pass through and initiate exclusion of the affected navigation satellite. As shown in FIG. 4, switch 181 may be a component external to processing module 100, or integrated within processing module 100.

As mentioned above, an ACE value is maintained in memory 150 for each of the reference receivers 99 and each satellite 200-1 through 200-N. As such, several possible ACE value triggers may be utilized by the ACE monitor 154. For example, in one embodiment, if a change in any one of the ACE values exceed the threshold, then switch 181 is operated to pass the IGM alarm. A threshold of approximately 1.5 meters of change in the ACE within a 100 second timeout period is an example of a suitable threshold, though other threshold values may provide suitable results. In other embodiments, changes in two, three, or all four of the ACE values must be detected before the ACE monitor 154 operates switch 181 to pass the IGM alarm. In still other embodiments, two or more ACE values may be combined, averaged, or another statistical analysis performed to determine whether the IGM alarm should be passed.

Because an accumulated carrier error can be affected by several factors, its usefulness for identifying false IGM alarms actually diminishes over time the longer changes in ACE values are observed. Accordingly, the ACE monitor 154 coordinates operation of switch 181 with a timer 156 (which may be integral to or separate from the ACE monitor 154). Timer 156 ensures that a persistent IGM alarm output from gradient estimator monitor 130 is only blocked for a limited time. For example, in one embodiment, when the ACE monitor 154 receives an IGM alarm, timer 156 is started. If timer 156 times-out, switch 181 is operated to pass the IGM alarm through to the ground station. If ACE monitor 154 observes that a change in ACE values exceeds the threshold value before timer 156 times-out, then switch 181 is operated to pass the IGM alarm through. If the IGM alarm output from gradient estimator monitor 130 terminates, both timer 156 and the ACE monitor 154 reset to their initial condition and switch 181 is either returned to, or maintained in, its normally open state. For the purpose of mitigating false IGM alarms, timer 156 can be set to time-out anywhere from a few 10's of seconds to a few 100's of seconds. For example, in one embodiment, timer 156 will time-out and operate switch 181 after 400 seconds have elapsed from the initiation of the IGM alarm.

Figure 5:
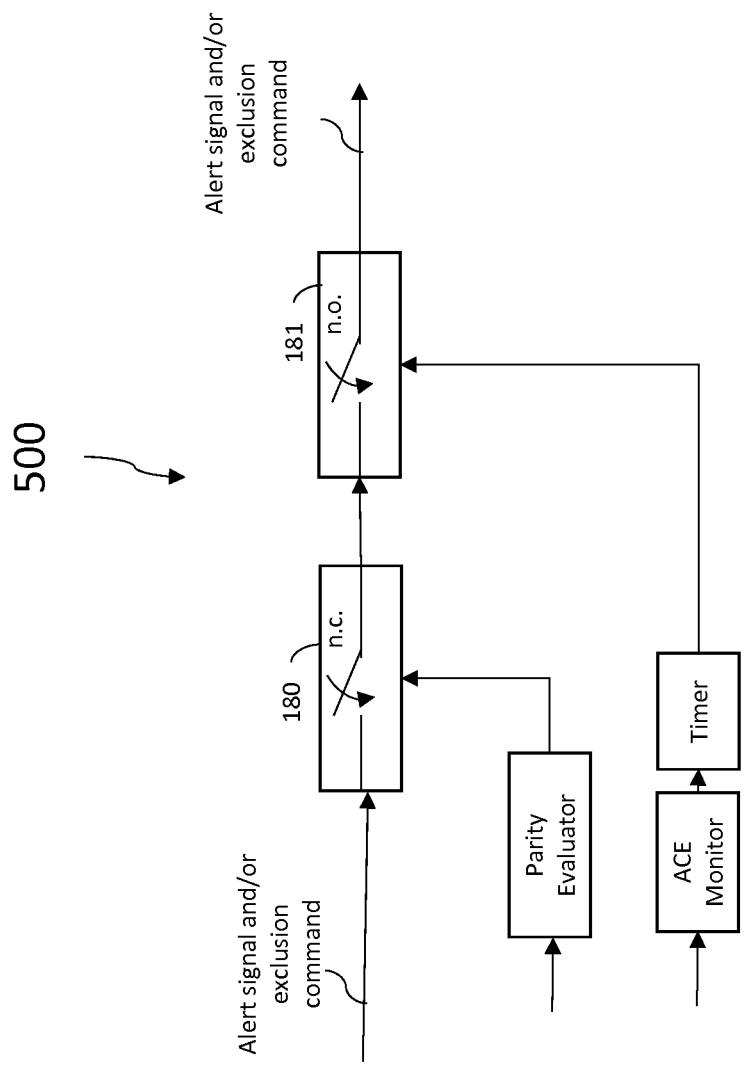
FIG. 5 is a diagram illustrating a processing module implementing another false alarm detection scheme of one embodiment of the present disclosure.

As illustrated by FIG. 5 generally at 500, both parity and ACE based false alarm mitigation schemes may be combined and integrated together to arrive at other embodiments of the present invention. In this example embodiment, parity evaluator 170 and the ACE monitor 154 each function independently as described above, and switches 180 and 181 are logically arranged so that an IGM alarm passes only when both agree to pass the IGM alarm. This can be achieved through a series arrangement of the switches 180 and 181 (as shown in FIG. 5), or another arrangement of switches or logic arranged to provide the equivalent function.

FIG. 6 is a flow chart illustrating a method 600 for mitigating false gradient alarms in a GBAS ground station of one embodiment of the present disclosure. It should be appreciated that method 600 may be performed to implement either the parity based false alarm mitigation scheme or the accumulated carrier error (ACE) based false alarm mitigation scheme described in any of the embodiments above, or both schemes in combination. Method 600 begins at 610 with generating an alarm signal with an ionosphere gradient monitor. The method proceeds to 620 with determining whether the alarm signal is a false alarm based on data derived from carrier phase measurements received from a plurality of satellite navigation system reference receivers. The method then proceeds to 630 with blocking the alarm signal for at least a first duration of time based on the determination at block 620.

In one parity based embodiment, determining whether the alarm signal is a false alarm at block 620 comprises comparing carrier phase double difference data from a plurality of satellite navigation system reference receivers. As explained above, inconsistencies in carrier phase double difference data between two reference receiver pairs result in a non-zero parity value. When the parity value exceeds the predefined threshold, then the alarm signal may be defined as a false alarm. In that case, the method at 630 proceeds with blocking the alarm signal for as long as the parity value exceeds the threshold. For implementing method 600 with an embodiment such as illustrated in FIG. 2, the carrier phase double difference data for each of the satellite navigation system reference receiver pairs may be obtained from the output of the double differencing module 120, or alternately from memory if the carrier phase double difference data is stored, for example, in memory 150.

In one ACE based embodiment, determining whether to define the alarm signal as a false alarm at block 620 comprises observing the change in ACE values from the time when the alarm signal is generated. If a change in the ACE values exceeds a threshold (1.5 meters of change, for example), then the alarm signal may be defined as a valid alarm and not a false alarm. In that case, the method at 630 proceeds with blocking the alarm signal until the alarm signal has been determined to be a valid alarm at 620. Further, in one embodiment, in the case where determining whether the alarm signal is a false alarm at block 620 is not completed within a predefined time-out period, the method at 630 proceeds with blocking the alarm signal until the time-out period has expired and then passes the alarm signal.

Example Embodiments

Example 1 includes a system for mitigating ionosphere gradient monitor (IGM) false alarms, the system comprising: at least three global navigation satellite reference receivers that output carrier phase measurements; a processing module coupled to the at least three global navigation satellite reference receivers, the processing module comprising a gradient estimator module that outputs an IGM alarm via a switch when an excessive delay gradient is detected based on the carrier phase measurements; a parity evaluator coupled to the switch, wherein the parity evaluator inputs carrier phase double difference data calculated from the carrier phase measurements and determines a parity error from the carrier phase double difference data, wherein when the parity error exceeds a threshold the parity evaluator operates the switch to block the IGM alarm.

Example 2 includes the system of example 1, the processing module further comprising: a satellite difference module that inputs the carrier phase measurements; and a double differencing module coupled to the satellite difference module, where the double differencing module calculates the carrier phase double difference data.

Example 3 includes the system of example 2, wherein the processing module further comprises a memory; wherein the carrier phase double difference data is stored in the memory and retrieved by the parity evaluator when an IGM alarm is generated.

Example 4 includes the system of any of examples 1-3, wherein the parity error is calculated as a function of a difference between a first carrier phase double difference value calculated for a first pair of the global navigation satellite reference receivers and a second carrier phase double difference value calculated for a second pair of the global navigation satellite reference receivers.

Example 5 includes the system of any of examples 1-4, wherein the parity evaluator operates the switch to block the IGM alarm when the parity error exceeds a threshold.

Example 6 includes the system of any of examples 1-5, wherein one or both of the parity evaluator and the switch are integrated into the processing module.

Example 7 includes the system of any of examples 1-6, further comprising: an accumulated carrier error monitor, wherein the accumulated carrier error monitor inputs accumulated carrier error data calculated from the carrier phase measurements, wherein the accumulated carrier error monitor operates a second switch to permit pass-through of the IGM alarm when a change in accumulated carrier error associated with at least one of the global navigation satellite reference receivers exceeds a second threshold.

Example 8 includes system for mitigating ionosphere gradient monitor (IGM) false alarms, the system comprising: a plurality of global navigation satellite reference receivers that output carrier phase measurements; a processing module coupled to the plurality of global navigation satellite reference receivers, the processing module comprising a gradient estimator module that outputs an IGM alarm via a normally-open switch when an excessive delay gradient is detected based on the carrier phase measurements; an accumulated carrier error monitor coupled to the switch, wherein the accumulated carrier error monitor inputs accumulated carrier error data calculated from the carrier phase measurements, wherein the accumulated carrier error monitor operates the switch to permit pass-through of the IGM alarm when a change in accumulated carrier error associated with at least one of the global navigation satellite reference receivers exceeds a threshold.

Example 9 includes the system of example 8, the processing module further comprising: a satellite difference module that inputs the carrier phase measurements; a double differencing module coupled to the satellite difference module, where the double differencing module generates a carrier phase double difference data output to the gradient estimator module.

Example 10 includes the system of example claims 8 or 9, the processing module further comprising: a carrier error accumulator that inputs the carrier phase measurements to calculate the accumulated carrier error values for each of the global navigation satellite reference receivers and stores the accumulated carrier error values in a memory; wherein the accumulated carrier error monitor inputs the accumulated carrier error values from the memory.

Example 11 includes the system of example 10, wherein the accumulated carrier error values are stored in the memory and retrieved by the accumulated carrier error monitor when an IGM alarm is generated.

Example 12 includes the system of any of examples 8-11, wherein one or both of the accumulated carrier error monitor and the switch are integrated into the processing module.

Example 13 includes the system of any of example 8-12, wherein the accumulated carrier error monitor operates the switch when the change in accumulated carrier error exceeds the threshold within a pre-determined time duration.

Example 14 includes the system of any of example 8-13, wherein the change in accumulated carrier error is calculated as a function of change in accumulated carrier error for at least two of the global navigation satellite reference receivers.

Example 15 includes the system of any of examples 8-14, further comprising: a timer coupled to the switch, the timer configured to begin a time-out period starting when the IGM alarm is generated by the gradient estimator module; wherein when the time-out period has elapsed the switch is operated to permit pass-through of the IGM alarm.

Example 16 includes the system of example 15, wherein the time-out period is between 1 to 1000 seconds.

Example 17 includes the system of either example 15 or 16, wherein the timer is integral to the accumulated carrier error monitor.

Example 18 includes a method for mitigating false gradient alarms in a satellite navigation Ground Based Augmentation System (GBAS) ground station comprising a plurality of satellite navigation system reference receivers, the method comprising: generating an alarm signal with an ionosphere gradient monitor (IGM) at the GBAS ground station; determining whether the alarm signal is a false alarm based on data derived from carrier phase measurements received from the plurality of satellite navigation system reference receivers; and blocking the alarm signal for at least a first duration of time based on the determining.

Example 19 includes the method of example 18 wherein the plurality of satellite navigation system reference receivers comprises at least three reference receivers, the method further comprising: comparing carrier phase double difference data derived from the carrier phase measurements to calculate a parity error value; and when the parity value exceeds a predefined threshold, blocking the alarm signal for at least a first duration of time further comprises blocking the alarm signal for as long as the parity error value exceeds the threshold.

Example 20 includes the method of either example 18 or 19 further comprising: observing a change in accumulated carrier error values starting from a time when the alarm signal is generated; when the change in the accumulated carrier error values exceeds a threshold, blocking the alarm signal for at least a first duration of time further comprises either passing the alarm signal when the change in the accumulated carrier error value exceeds a threshold, or passing the alarm signal when a predefined time-out period elapses, whichever occurs first.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system for mitigating ionosphere gradient monitor (IGM) false alarms, the system comprising:
    at least three global navigation satellite reference receivers that output carrier phase measurements;
    a processing module coupled to the at least three global navigation satellite reference receivers, the processing module comprising a gradient estimator module that outputs an IGM alarm via a switch when an excessive delay gradient is detected based on the carrier phase measurements; and
    a parity evaluator coupled to the switch, wherein the parity evaluator inputs carrier phase double difference data calculated from the carrier phase measurements and determines a parity error from the carrier phase double difference data, wherein when the parity error exceeds a threshold the parity evaluator operates the switch to block the IGM alarm.

2. The system of claim 1, the processing module further comprising:
    a satellite difference module that inputs the carrier phase measurements; and
    a double differencing module coupled to the satellite difference module, where the double differencing module calculates the carrier phase double difference data.

3. The system of claim 2, wherein the processing module further comprises a memory;
    wherein the carrier phase double difference data is stored in the memory and retrieved by the parity evaluator when an IGM alarm is generated.

4. The system of claim 1, wherein the parity error is calculated as a function of a difference between a first carrier phase double difference value calculated for a first pair of the global navigation satellite reference receivers and a second carrier phase double difference value calculated for a second pair of the global navigation satellite reference receivers.

5. The system of claim 4, wherein the parity evaluator operates the switch to block the IGM alarm when the parity error exceeds a threshold.

6. The system of claim 1, wherein one or both of the parity evaluator and the switch are integrated into the processing module.

7. The system of claim 1, further comprising
    an accumulated carrier error monitor, wherein the accumulated carrier error monitor inputs accumulated carrier error data calculated from the carrier phase measurements, wherein the accumulated carrier error monitor operates a second switch to permit pass-through of the IGM alarm when a change in accumulated carrier error associated with at least one of the global navigation satellite reference receivers exceeds a second threshold.

8. A system for mitigating ionosphere gradient monitor (IGM) false alarms, the system comprising:
    a plurality of global navigation satellite reference receivers that output carrier phase measurements;
    a processing module coupled to the plurality of global navigation satellite reference receivers, the processing module comprising a gradient estimator module that outputs an IGM alarm via a normally-open switch when an excessive delay gradient is detected based on the carrier phase measurements; and
    an accumulated carrier error monitor coupled to the switch, wherein the accumulated carrier error monitor inputs accumulated carrier error data calculated from the carrier phase measurements, wherein the accumulated carrier error monitor operates the switch to permit pass-through of the IGM alarm when a change in accumulated carrier error associated with at least one of the global navigation satellite reference receivers exceeds a threshold.

9. The system of claim 8, the processing module further comprising:
    a satellite difference module that inputs the carrier phase measurements; and
    a double differencing module coupled to the satellite difference module, where the double differencing module generates a carrier phase double difference data output to the gradient estimator module.

10. The system of claim 8, the processing module further comprising:
    a carrier error accumulator that inputs the carrier phase measurements to calculate the accumulated carrier error values for each of the global navigation satellite reference receivers and stores the accumulated carrier error values in a memory;
    wherein the accumulated carrier error monitor inputs the accumulated carrier error values from the memory.

11. The system of claim 10, wherein the accumulated carrier error values are stored in the memory and retrieved by the accumulated carrier error monitor when an IGM alarm is generated.

12. The system of claim 8, wherein one or both of the accumulated carrier error monitor and the switch are integrated into the processing module.

13. The system of claim 8, wherein the accumulated carrier error monitor operates the switch when the change in accumulated carrier error exceeds the threshold within a pre-determined time duration.

14. The system of claim 8, wherein the change in accumulated carrier error is calculated as a function of change in accumulated carrier error for at least two of the global navigation satellite reference receivers.

15. The system of claim 8, further comprising:
a timer coupled to the switch, the timer configured to begin a time-out period starting when the IGM alarm is generated by the gradient estimator module;
wherein when the time-out period has elapsed the switch is operated to permit pass-through of the IGM alarm.

16. The system of claim 15, wherein the time-out period is between 1 to 1000 seconds.

17. The system of claim 15, wherein the timer is integral to the accumulated carrier error monitor.

18. A method for mitigating false gradient alarms in a satellite navigation Ground Based Augmentation System (GBAS) ground station comprising a plurality of satellite navigation system reference receivers, the method comprising:

generating an alarm signal with an ionosphere gradient monitor (IGM) at the GBAS ground station;
determining whether the alarm signal is a false alarm based on data derived from carrier phase measurements received from the plurality of satellite navigation system reference receivers; and
blocking the alarm signal for at least a first duration of time based on the determining.

19. The method of claim 18, wherein the plurality of satellite navigation system reference receivers comprises at least three reference receivers, the method further comprising:
comparing carrier phase double difference data derived from the carrier phase measurements to calculate a parity error value; and
when the parity value exceeds a predefined threshold, blocking the alarm signal for at least a first duration of time further comprises blocking the alarm signal for as long as the parity error value exceeds the threshold.

20. The method of claim 18 further comprising:
observing a change in accumulated carrier error values starting from a time when the alarm signal is generated;
when the change in the accumulated carrier error values exceeds a threshold, blocking the alarm signal for at least a first duration of time further comprises either passing the alarm signal when the change in the accumulated carrier error value exceeds a threshold, or passing the alarm signal when a predefined time-out period elapses, whichever occurs first.

* * * * *